(12) United States Patent
Schofield et al.

(10) Patent No.: US 6,198,409 B1
(45) Date of Patent: *Mar. 6, 2001

(54) VEHICLE REARVIEW MIRROR DISPLAY SYSTEM

(75) Inventors: Kenneth Schofield; Niall R. Lynam, both of Holland, MI (US)

(73) Assignee: Donnelly Corporation, Holland, MI (US)

( * ) Notice: Subject to any disclaimer, the term of this patent is extended or adjusted under 35 U.S.C. 154(b) by 0 days.

(21) Appl. No.: 09/304,201

(22) Filed: May 3, 1999

Related U.S. Application Data

(60) Continuation of application No. 09/119,532, filed on Jul. 20, 1998, which is a division of application No. 08/799,734, filed on Feb. 12, 1997, now Pat. No. 5,786,772.
(60) Provisional application No. 60/013,941, filed on Mar. 22, 1996.

(51) Int. Cl.$^7$ ........................................ G08G 1/16
(52) U.S. Cl. .................. 340/903; 340/436; 340/472; 280/735; 280/728.1
(58) Field of Search ..................... 340/436, 438, 340/472, 903, 905, 901; 280/735, 734, 728.1; 180/282, 271

(56) References Cited

U.S. PATENT DOCUMENTS

| | | |
|---|---|---|
| 4,171,875 | 10/1979 | Taylor et al. . |
| 4,694,295 | 9/1987 | Miller et al. . |
| 4,926,170 | 5/1990 | Beggs et al. . |
| 4,943,796 | 7/1990 | Lee . |
| 5,148,146 | 9/1992 | Murphy . |
| 5,173,881 | 12/1992 | Sindle . |
| 5,223,814 | 6/1993 | Suman . |
| 5,229,975 | 7/1993 | Truesdell et al. . |
| 5,235,316 | 8/1993 | Qualizza . |
| 5,280,555 | 1/1994 | Ainsburg . |
| 5,313,335 | 5/1994 | Gray et al. . |
| 5,339,075 | 8/1994 | Abst et al. . |
| 5,373,482 | 12/1994 | Gauthier . |
| 5,424,726 | 6/1995 | Beymer . |
| 5,424,952 | 6/1995 | Asayama . |

(List continued on next page.)

FOREIGN PATENT DOCUMENTS

| | | |
|---|---|---|
| 0381016A1 | 8/1990 | (EP) . |
| 1553376 | 9/1979 | (GB) . |
| 1566451 | 4/1980 | (GB) . |
| 2222991A | 3/1990 | (GB) . |

OTHER PUBLICATIONS

Product brochure entitled "SideMinder," published in 1993 by Autosense.

Commonly assigned co–pending application Serial No. 09/119,532, filed on Jul. 20, 1998, entitled Vehicle Blind Spot Detection Display System.

Commonly assigned co–pending application Serial No. 09/244,726, filed on Feb. 5, 1999, entitled Rearview Mirror Assembly Incorporating Vehicle Information Display.

*Primary Examiner*—Daniel J. Wu
*Assistant Examiner*—Anh La
(74) *Attorney, Agent, or Firm*—Van Dyke, Gardner, Linn & Burkhart, LLP

(57) ABSTRACT

A vehicle blind spot detection display system displays indications from a blind spot detector. The system includes a first indicator assembly positioned on the vehicle in the vicinity of an exterior mirror and adapted to producing an indication at least of the presence of an object adjacent the corresponding side of the vehicle. A second indicator assembly is provided on the vehicle interior mirror assembly and adapted to producing an indication at least of the presence of an object adjacent the same corresponding side of the vehicle. In this manner, redundant indications are provided at both the interior and exterior mirrors in order to assist the driver in a premaneuver evaluation of conditions surrounding the vehicle.

52 Claims, 5 Drawing Sheets

U.S. PATENT DOCUMENTS

| | | | |
|---|---|---|---|
| 5,428,340 | * | 6/1995 | Kawabata et al. .................... 340/438 |
| 5,455,716 | * | 10/1995 | Suman et al. ........................ 359/838 |
| 5,497,305 | | 3/1996 | Pastrick et al. . |
| 5,544,914 | * | 8/1996 | Borninski et al. ................... 280/735 |
| 5,631,639 | | 5/1997 | Hibino et al. . |
| 5,668,675 | | 9/1997 | Fredricks . |
| 5,689,264 | | 11/1997 | Ishikawa et al. . |
| 5,745,870 | | 4/1998 | Yamamoto et al. . |
| 5,786,772 | | 7/1998 | Schofield et al. . |
| 5,866,954 | * | 2/1999 | Daniel et al. ........................ 340/436 |
| 5,883,605 | * | 3/1999 | Knapp .................................. 359/603 |
| 6,019,475 | * | 2/2000 | Lynam ................................ 359/879 |

* cited by examiner

VEHICLE REARVIEW MIRROR DISPLAY SYSTEM

This application is a continuation of application Ser. No. 09/119,532, filed on Jul. 20, 1998, which is a division of application Ser. No. 08/799,734, filed on Feb. 12, 1997, now U.S. Pat. No. 5,786,772, which claims the benefits of U.S. provisional application Ser. No. 60/013,941, filed Mar. 22, 1996.

BACKGROUND OF THE INVENTION

This invention relates generally to vehicle blind spot detection systems and, more particularly, to a blind spot detection display system for displaying indications from a blind spot detector.

Blind spot detectors have been developed in order to detect the presence of a vehicle or other object in the driver's blind spot. The driver's blind spot is that portion of the vehicle in which an object will not normally be observed by the use of the interior and exterior mirrors of the vehicle. By detecting the presence of an object in the driver's blind spot, the blind spot detector is useful in assisting the driver in performing a premaneuver evaluation of the environment surrounding the vehicle in anticipation of a lane change or the like. Known blind spot detectors include active and passive infrared detectors, optical detectors, radar-based detectors, and the like.

A blind spot detection system requires a user interface in order to inform the user that an object is in the driver's blind spot. In order to be most effective, such user interface should be natural and provide an intuitive warning to the user. One prior art approach has been to provide a series of indication lights on the exterior mirror on the same side of the vehicle being protected by the blind spot detector. Alternatively, the display system may be mounted inside the vehicle compartment, but on the pillar adjacent the exterior rearview mirror. Such positioning of the display on, or adjacent to, the exterior rearview mirror provides association with the side of the vehicle being covered by the blind spot detector. The exterior mirror is typically considered by the vehicle operator to be secondary to the interior rearview mirror in importance in premaneuver evaluation. As such, it may be possible for the vehicle operator to overlook indications made by display systems associated with the exterior rearview mirror until late in the premaneuver evaluation. The presence of precipitation or road dirt on either the side window or the mirror itself may further reduce the clarity of indication to the driver. In order to overcome this difficulty, it has been proposed to provide an audio warning of the presence of a vehicle in the driver's blind spot in order to augment a visual indicator. While such audio indicator is readily perceived by the vehicle operator, the frequency with which vehicles enter and leave the blind spot results in an excessive frequency of indication which can be annoying to the driver. In order to overcome such annoyance, the driver may mentally "tune out" the audio indicator reducing its effectiveness. Furthermore, the existence of an annoyance to the driver reduces the overall alertness of the driver to traffic situations.

SUMMARY OF THE INVENTION

The present invention is intended to provide a vehicle blind spot detection display system which overcomes the defects of previous blind spot detection display systems. This is accomplished in a manner which provides a natural and intuitive indication to the driver which is useful as a part of the premaneuver evaluation by the driver.

A vehicle blind spot detection display system for displaying indications from a blind spot detector, according to the invention, is used on a vehicle having a passenger compartment and at least one exterior mirror on one side of the vehicle outside of the passenger compartment. The blind spot detection display system includes a first indicator assembly positioned on the vehicle in the vicinity of the exterior mirror and adapted to producing an indication at least of the presence of an object adjacent that side of the vehicle. The blind spot detection display system additionally includes an interior mirror assembly within the passenger compartment. The interior mirror assembly includes a reflective element, a housing for the reflective element and a second indicator assembly. The second indicator assembly is adapted to producing an indication at least of the presence of an object adjacent the one side of the vehicle. This is important because the driver usually initiates the premaneuver evaluation by scanning the interior mirror prior to checking exterior mirrors.

Because parallel indications are given to the operator at the interior mirror assembly of the presence of an object adjacent the vehicle, the driver is provided with an indication at the start and at the end of the premaneuver evaluation of the presence or absence of an object in the vehicle blind spot. In this manner, a blind spot detection display system, according to the invention, provides multiple indications to the vehicle operator during the premaneuver evaluation. Furthermore, the invention overcomes many of the known difficulties associated with the prior art blind spot detection display systems associated with exterior rearview mirrors in which frost, dew and/or road dirt may mask the blind spot detection display system.

These and other objects, advantages and features of this invention will become apparent upon review of the following specification in conjunction with the drawings.

DESCRIPTION OF THE PREFERRED EMBODIMENT

Figure 1:
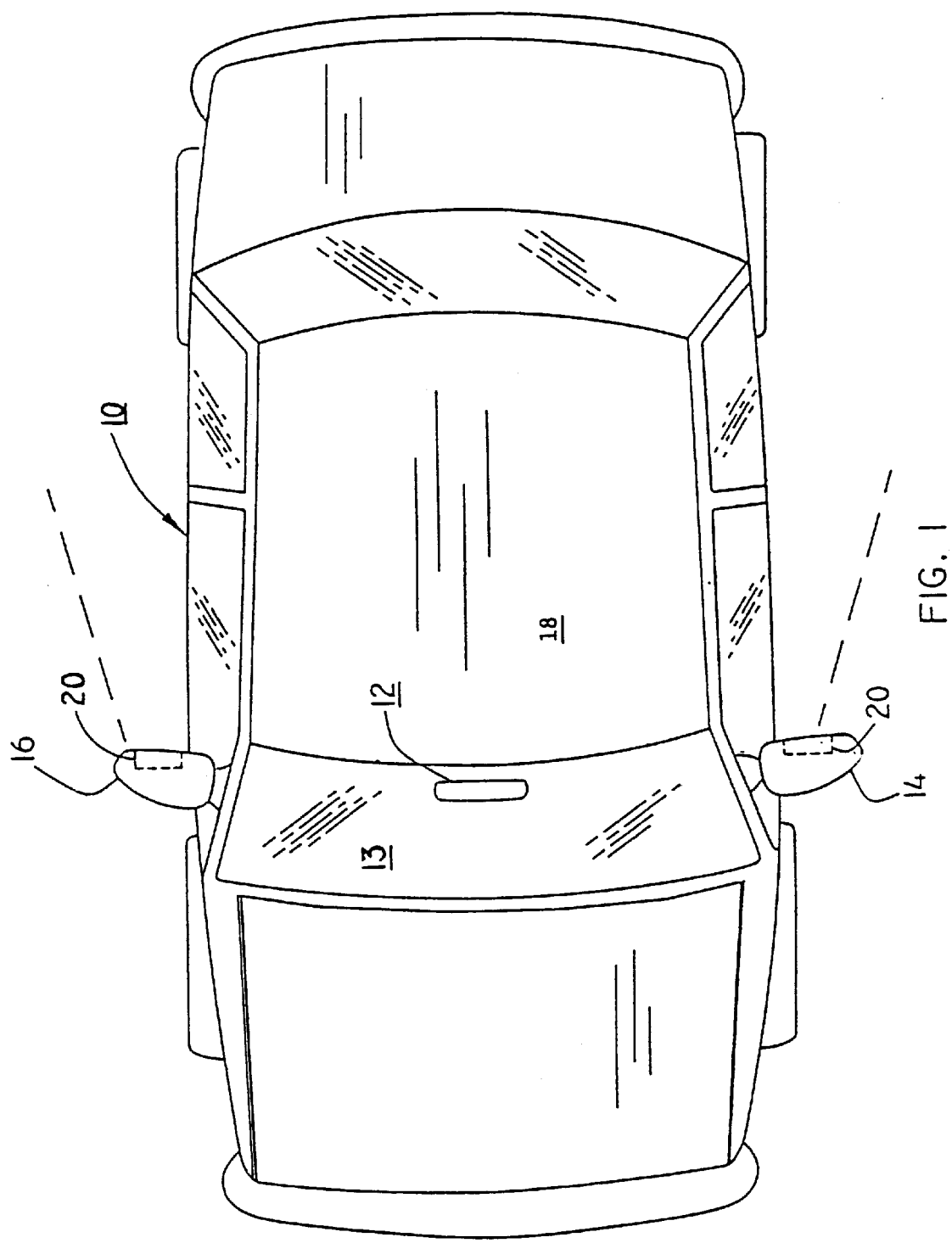
FIG. 1 is a top plan view of a vehicle having a blind spot detection system, according to the invention.
Figure 2:
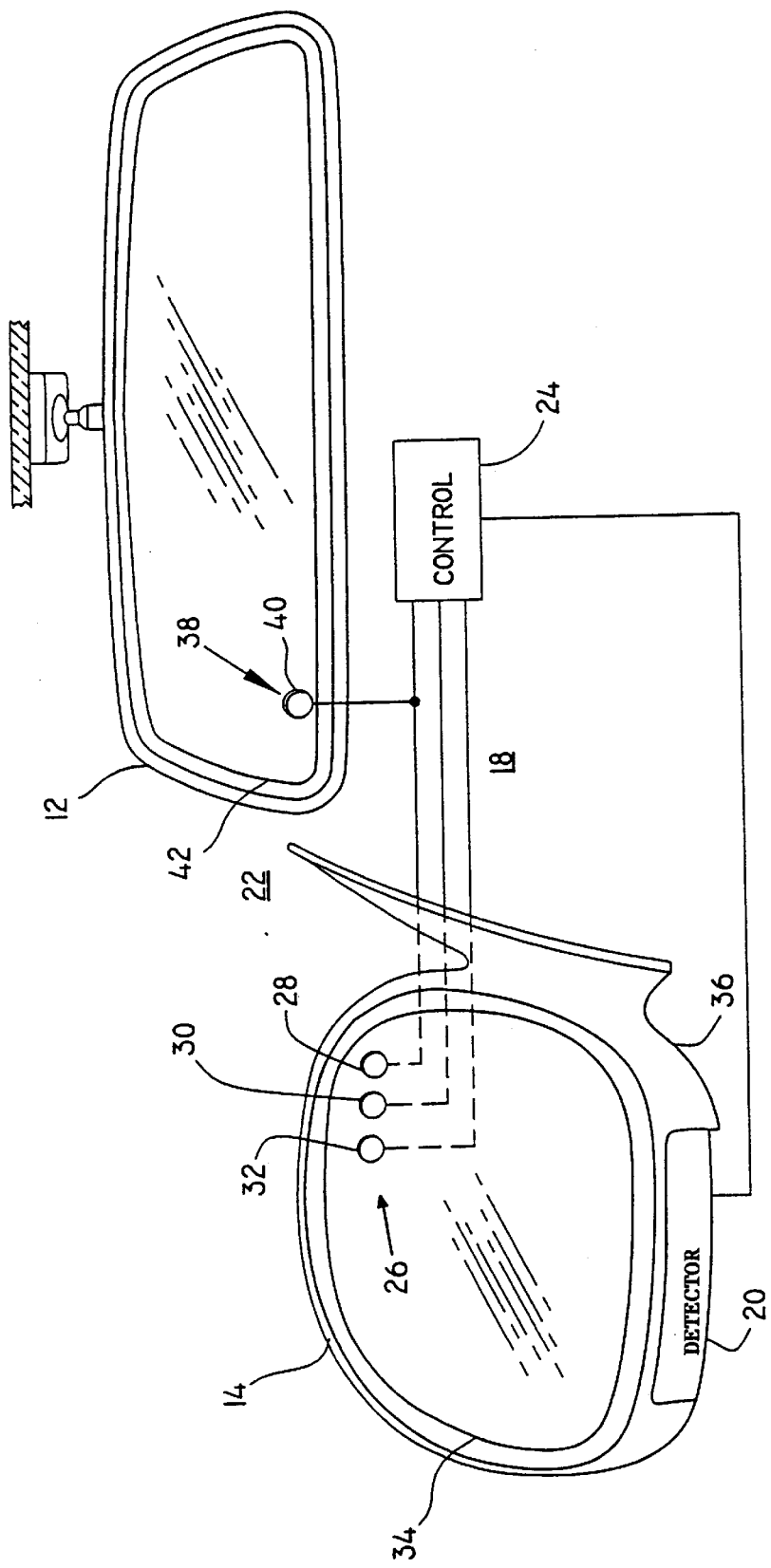
FIG. 2 is a block diagram and partial schematic diagram of a blind spot detection display system, according to the invention, as viewed by a vehicle operator.

Referring now specifically to the drawings, and the illustrative embodiments depicted therein, a vehicle 10 includes an interior rearview mirror 12 positioned within passenger compartment 13 of vehicle 10, a driver's side exterior rearview mirror 14 and a passenger's side exterior rearview mirror 16 (FIG. 1). Vehicle 10 further includes a blind spot detection system 18 made up of a blind spot detector 20 and a blind spot detection display system 22 (FIG. 2). The blind spot detector may be an infrared blind spot detection system of the type disclosed in U.S. provisional application Ser. No. 60/013,941, filed Mar. 22, 1996, by Kenneth Schofield entitled PROXIMITY DETECTION OF OBJECTS IN AND AROUND A VEHICLE, the disclosure of which is hereby incorporated by reference, or International Patent Application No. WO 9525322 A1, published Sep. 21, 1995, by Patchell et al., entitled VEHICLE-MOUNTED DETECTOR TO SENSE MOVING VEHICLE IN BLIND SPOT; an optical blind spot detection system of the type disclosed in U.S. Pat. No. 5,424,952 (Asayama); a radar-based blind spot detection system of the type disclosed in U.S. Pat. No. 5,325,096 (Pakett); an ultrasonic blind spot detection system of the type disclosed in U.S. Pat. No. 4,694,295 (Miller et al.); or any other of the known types of blind spot detection systems. As is common, blind spot detector 20 may be incorporated in exterior mirrors 14, 16, but may, alternatively, be independently positioned on the side of the vehicle being protected by the blind spot detector, as is known in the art. Blind spot detector 20 may include a separate control 24 or may incorporate the control function in the same housing with the blind spot detector 20.

Blind spot detection display system 22 includes a first indicator assembly 26 positioned on vehicle 10 in the vicinity of driver's side exterior mirror 14. First indicator assembly 26 includes a first indicator 28 to produce a visual indication to the driver of the presence of an object, such as an overtaking vehicle, adjacent the driver's side of the vehicle. First indicator assembly 26 may include a second indicator 30 that the blind spot detector is operational. First indicator assembly 26 may additionally include a third indicator 32 which provides an indication that an object in the blind spot on the driver's side of the vehicle is receding from that blind spot. In order to provide additional visual clues to the driver of the meaning of each of the indicators, the first indicator 28 is most preferably a red indicator, the second indicator 30 is a green indicator and third indicator 32 is an amber indicator. In the illustrated embodiment, first indicator assembly 26 is positioned on passenger's side exterior mirror 14 and, more specifically, includes a plurality of LED indicators positioned behind the reflective element 34 of the exterior mirror. Alternatively, the first indicator assembly 26 may be positioned on the face of housing 36 for reflective element 34. Alternatively, first indicator assembly 26 may be positioned in the pillar (not shown) located on the driver's side of the vehicle. Although not on the driver's side exterior mirror, such location on the pillar is adjacent on the driver's side exterior mirror.

Blind spot detection display system 22 includes a second indicator assembly 38 positioned on interior mirror assembly 12. Second indicator assembly 38 includes a first indicator 40 to provide an indication of the presence of an object adjacent the driver's side of the vehicle. As such, first indicator 40 is illuminated concurrently with first indicator 28 of first indicator assembly 26. Although not shown, second indicator assembly 38 may, optionally, include second and third indicators which are illuminated concurrently with second and third indicators 30, 32 of first indicator assembly 26. Preferably, only a single indicator is provided in order to provide an awareness to the driver of the primary indication produced by a blind spot detector; namely, the presence of a vehicle adjacent the associated side of the vehicle. In order to increase the cognitive association by the driver between the indication and the event being indicated, second indicator assembly 38 is positioned at a portion 42 of interior mirror 12 which is toward the driver's side of vehicle 10.

Figure 3:
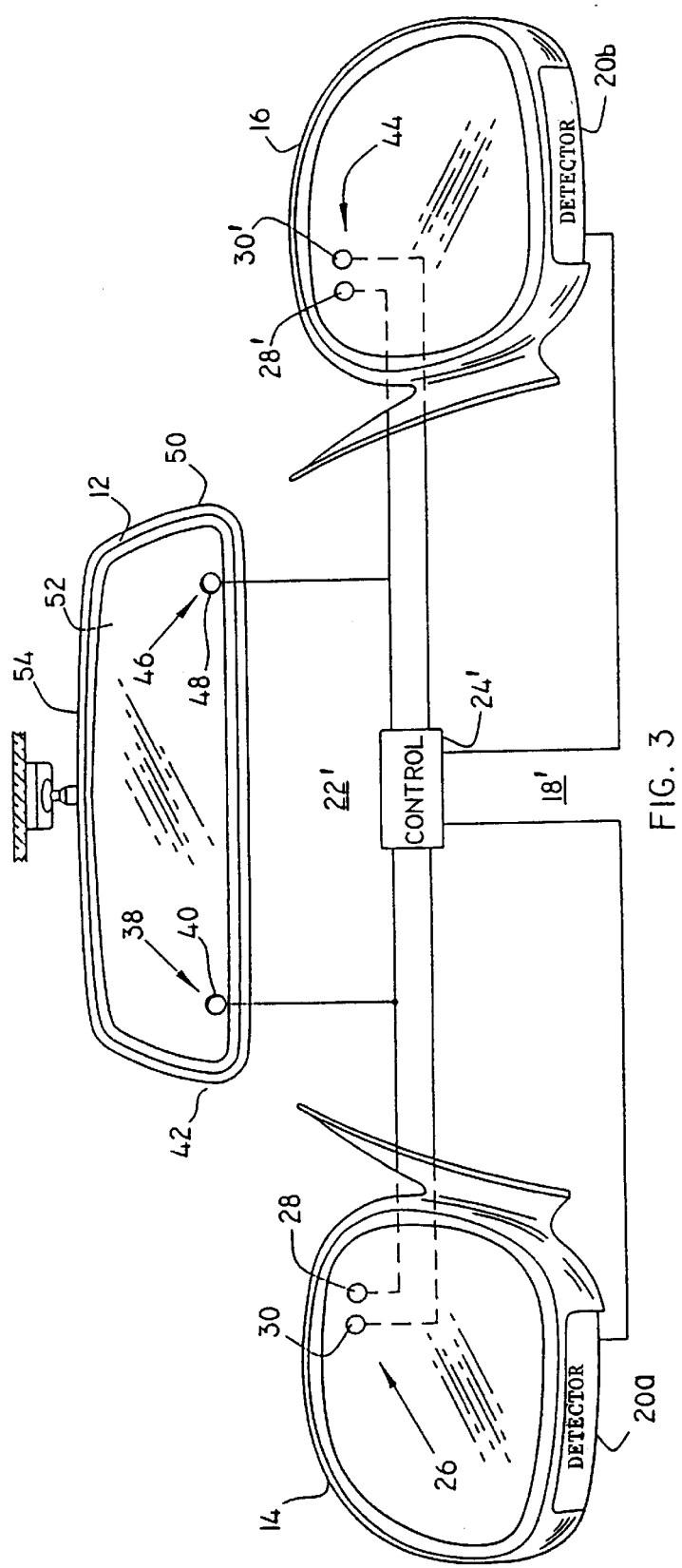
FIG. 3 is the same view as FIG. 2 of an alternative embodiment of a blind spot detection display system, according to the invention.

In a second embodiment, as illustrated in FIG. 3, a blind spot detection system 18' includes a first blind spot detector 20a detecting the presence of objects in the blind spot on the driver's side of the vehicle and a second blind spot detector 20b detecting the presence of objects in the blind spot on the passenger's side of the vehicle. Blind spot detection system 18' includes a blind spot detection display system 22' which includes a third indicator assembly 44 positioned on vehicle 10 adjacent passenger's side exterior mirror 16. Blind spot detection display system 22' additionally includes a fourth indicator assembly 46 on interior mirror assembly 12. Both the third and fourth indicator assemblies are adapted to producing an indication at least of the presence of an object adjacent the passenger's side of vehicle 10. Fourth indicator assembly 46 includes a first indicator 48 which is illuminated concurrently with a first indicator 28' of third indicator assembly 44. Third indicator assembly 44 may include a second indicator 30' to indicate that blind spot detector 20b is operational. In the illustrated embodiment, blind spot detection system 18' does not include an indication of the presence of a vehicle in the blind spot that is receding from the respective side of the vehicle. However, such third indicator may optionally be provided. First indicator 48 of fourth indicator assembly 46 is positioned at a portion 50 of exterior mirror 12 which is toward the passenger's side of the vehicle. In this manner, additional cognitive association is provided for the purpose of association by the driver between the indication and the event being indicated.

In use, first and second indicator assemblies 26, 38 will provide an indication to the driver of the presence of a vehicle, or other object, in the driver's blind spot on the driver's side of the vehicle and third and fourth indicator assemblies 44, 46 will provide an indication to the driver of the presence of a vehicle, or other object, in the driver's blind spot on the passenger's side of the vehicle. When the driver performs a premaneuver evaluation, the driver is immediately apprised of the presence of a vehicle on the passenger's and/or driver's side of the vehicle upon the driver's viewing of the interior rearview mirror 12, which research indicates is the first step taken by most drivers in initiating the premaneuver evaluation prior to making a lane change or the like. During subsequent portions of the premaneuver evaluation, the driver may initially be apprised of the presence of a vehicle in the driver's side blind spot by first indicator assembly 26 or in the passenger's side blind spot by the third indicator assembly 44 when viewing the respective exterior mirror assembly 14, 16. Thus, it is seen that a natural and intuitive blind spot detection display system is provided. Blind spot detection display system 22, 22' not only provides indications to the driver of the presence of a vehicle in a blind spot during more portions of the premaneuver evaluation, but additionally provides indications to the driver should dew, frost, or road dirt mask the indication associated with the exterior rearview mirrors.

Control 24, 24' may modulate the intensity of the indication provided by the first, second, third and fourth indicator assemblies primarily as a function of light levels surrounding vehicle 10. This may be in response to light levels sensed by light sensors (not shown) associated with a drive circuit (not shown) for establishing the partial reflectance level of interior rearview mirrors 12 and/or exterior rearview mirrors 14, 16 or may be a separate light sensor provided for the purpose of establishing an input to control 24, 24'.

In the illustrative embodiment, interior rearview mirror 12 includes a reflective element 52 and a housing 54 for reflective element 52. Second and fourth indicator assemblies 38, 46 may be positioned on reflective element 52 and provide a through-the-cell display such as of the type disclosed in U.S. Pat. No. 5,285,060 issued to Mark L. Larson et al. for a DISPLAY FOR AUTOMATIC REAR-VIEW MIRROR, the disclosure of which is hereby incorporated herein by reference. In particular, if the indicator assembly is behind a variable reflective element, the intensity of the indicator assembly is adjusted as a function of the reflectance level of the variable reflective element as disclosed in the '060 patent.

Figure 4:
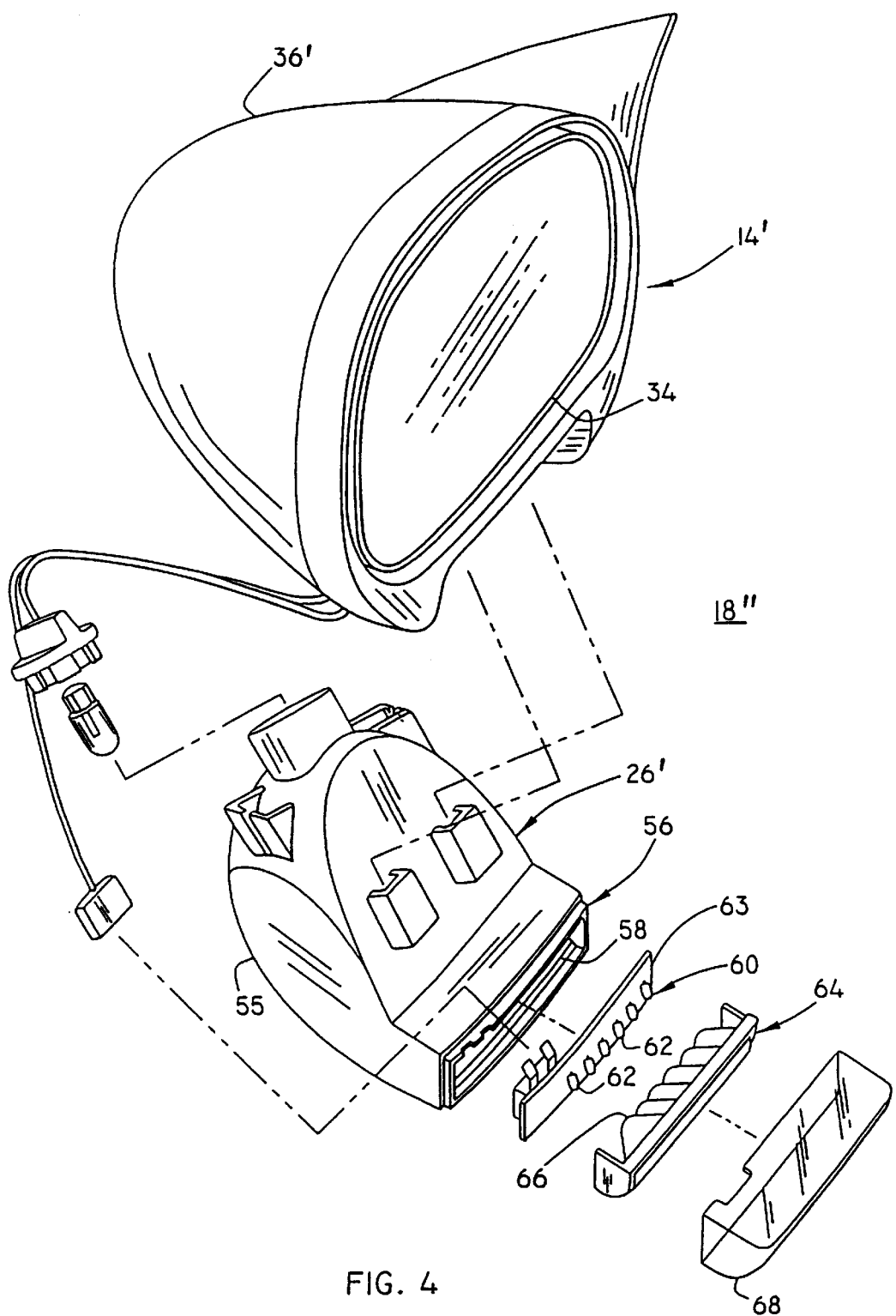
FIG. 4 is a perspective view of another alternative embodiment of a blind spot detection display system, according to the invention.

In an alternative embodiment, a blind spot detection system 18" includes an exterior mirror 14' having a reflective element 34' and a housing 36' for the reflective element (FIG. 4). A first indicator assembly 26' is composed of a sealed module mounted to housing 36' in a manner which completes the overall slope of the exterior mirror. Such module is generally constructed according to the principles described in U.S. Pat. No. 5,497,306 issued to Todd W. Pastrick for an EXTERIOR VEHICLE SECURITY LIGHT, the disclosure of which is incorporated herein by reference. First indicator assembly 26' includes a module 56 made up of a case 55 having an opening 58 and an optionally transmitting cover or lens 68 closing the opening in a manner which provides a sealed enclosure. A lamp assembly 60 is positioned within opening 58 and includes a plurality of indicators, such as light-emitting diodes (LEDs) 62 physically supported by and electrically actuated through a printed circuit board 63. A lower assembly 64 provides a plurality of louvers 66 which separate the LEDs and direct the light generated by the LEDs in the direction of a driver seated in vehicle 10.

In operation, the plurality of indicators making up indicator assembly 26' are cumulatively progressively energized in a manner which indicates that another vehicle is approaching the detected blind spot of vehicle 10 and is actually within the blind spot of the vehicle. For example, a progressively greater number of indicators can be energized as another vehicle approaches the blind spot of vehicle 10, with the number of energized indicators increasing as the other vehicle gets closer to the blind spot of vehicle 10. When the other vehicle is actually within the blind spot of vehicle 10, all of the indicators would be actuated. As the other vehicle moves out of the blind spot of vehicle 10, the number of energized indicators will decrease the further the other vehicle moves from the blind spot.

The indicator assemblies may perform multiple display functions such as providing indication of an additional vehicle function, such as a compass mirror display function, a temperature display function, a passenger air bag disable display function, an automatic rain sensor operation display function, or the like. Such automatic rain sensor operation display function may include a display function related to both a windshield-contacting and a non-windshield-contacting rain sensor, including, for example, where the circuitry to control the rain sensor, electrochromic dimming of a variable reflectance electrochromic mirror, and any other mirror-mounted electronic feature are commonly housed in a rearview mirror assembly and wholly or partially share components on a common circuit board. The blind spot detection display or the automatic rain sensor operation display may alternate with the other display function by a display toggle which may be manually operated, time-shared, voice-actuated, or under the control of some other sensed function, such as a change in direction of the vehicle or the like. For example, if the through-the-cell display described in the Larson et al. '060 patent is used, it would be desirable to minimize the size of the display because the display generally takes away from the viewing area of the mirror. Multiple parameters, such as temperature, vehicle heading, and one or more icons, can all be indicated without increasing the size of the display by, for example, having the one or more icons coming on for a particular interval followed by display of the temperature and vehicle heading. For example, the temperature and heading displays can be time-shared by alternatingly displaying temperature and heading with the cycle of alternation selected from a range of from approximately one (1) second to approximately 25 seconds. Alternatively, the driver can be provided with an input device, such as a switch, to allow the driver to choose which parameter to display. In yet an additional alternative, one of the parameters can be normally displayed with the driver being provided with an override function to allow display of the other parameter. Other variations will be apparent to those skilled in the art.

Figure 5:
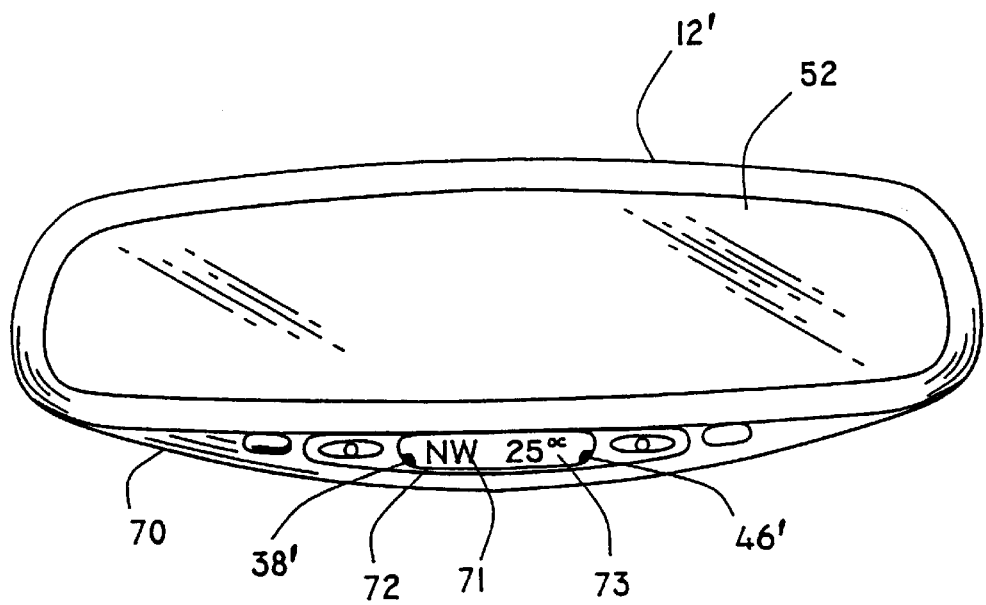
FIG. 5 is a rear elevation of an interior mirror incorporating another alternative embodiment of a blind spot detection display system, according to the invention.

Rather than being displayed in a through-the-cell display, the second and fourth indicator assemblies may be positioned on housing 54' of an interior rearview mirror 12' (FIG. 5). In particular, the second and fourth indicator assemblies may be positioned on an "eyebrow" display portion of the housing above reflective element 52 (not shown) or a "lip" portion 70 of housing 54 below reflective element 52. For this purpose, a display 72 is provided on lip portion 70 for displaying a blind spot indicator 38' for the left side of vehicle 10 and a blind spot indicator 46' for the right side of the vehicle for illumination as required to indicate the presence of vehicles in, or approaching, the respective blind spot. Display 72 may further display a vehicle heading indicia 71 and a temperature indicia 73.

Figure 6:
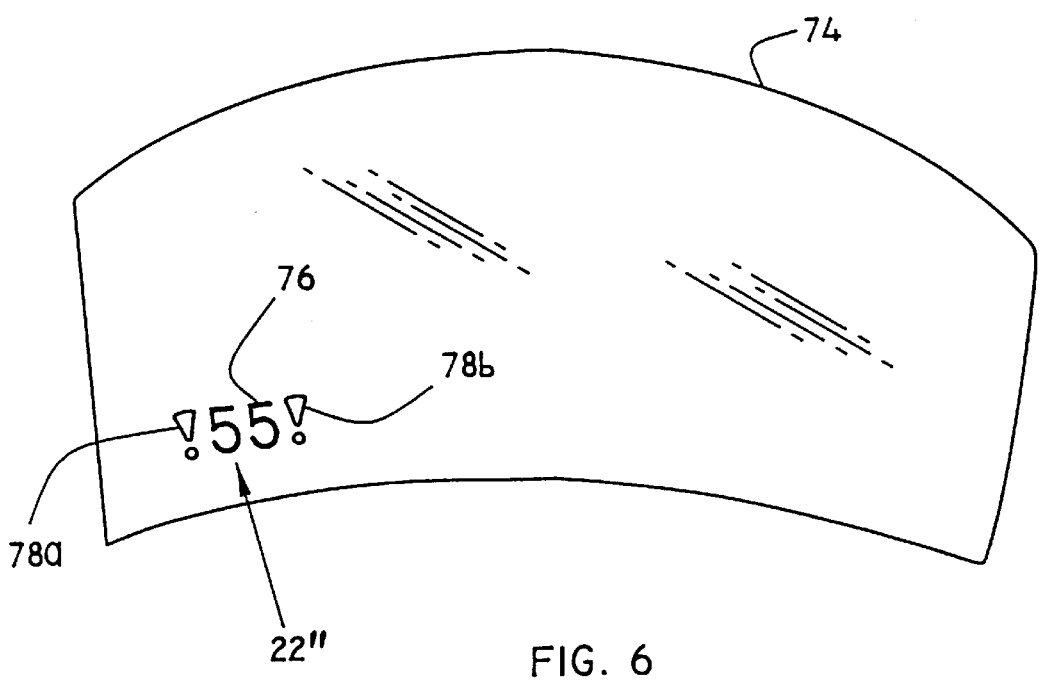
FIG. 6 is a rear elevation of a vehicle windshield incorporating yet another alternative embodiment of a blind spot detection system, according to the invention.

In an alternative embodiment of the invention, a heads-up display, such as is conventionally on vehicles to display vehicle speed, and the like, may include a blind spot detector display system 28" that illuminates for viewing through a vehicle windshield 74 when a vehicle has entered the blind spot detection zone on either side of the vehicle (FIG. 6). Thus, as shown in FIG. 6, a heads-up digital indication 76 of vehicle speed is framed on either side by heads-up blind spot indicators 78a, 78b. Heads-up digital indication 76 is illustrated at the driver side of the vehicle. When a vehicle is detected to be approaching or to enter the blind spot zone, then the respective indicators 78a, 78b may illuminate to signal to the driver a potential blind spot hazard. Being a heads-up display directly in the forward vision of the driver, use of a heads-up blind spot indicator is a convenient, safe, and efficient means to alert the driver without the driver having to remove his line of sight from the forward road scene. As an alternate, or a supplement, to mere illumination, the blind spot indicators 78a, 78b can change color (such as from green to amber to red), change in size or shape, or strobe/flash so as to alert the driver to an increase in potential blind spot hazard as the side approaching vehicle moves from mere approaching to deeper into the blind spot zone. Alternatively, indicators 78a, 78b can be combined with display of the vehicle's turn signals so that the driver is warned of the presence of a vehicle in, or approaching, the blind spot in response to the driver actuating the corresponding turn signal indicating a possible intention to change lanes.

The passenger air bag disable function, which may alternately be displayed by the same icon as second indicator assembly or fourth indicator assemblies 38, 46, may be for the purpose of indicating to the driver that the passenger's side air bag has been disabled in a vehicle having a function which allows the passenger's side air bag to be disabled. In one such system, the driver may be provided with an option to elect to disable the passenger's side air bag utilizing the ignition key of the vehicle in a key operation that occurs separate from, but prior to, key- operated ignition of the engine. Preferably, the same key is required for both the air bag disable operation and the ignition-on operation. In such control system, prior to actuating the ignition system of the vehicle, the operator is provided with an option of disabling the passenger's side air bag. When the ignition is, again, turned off at the end of operating the vehicle and the ignition is, again, actuated upon operating the vehicle subsequently, the passenger's side air bag is automatically reactivated unless the driver once again deactivates the passenger's side air bag. In this manner, the driver must make a conscious decision each time the vehicle is operated to disable the passenger's side air bag and, conveniently and securely, this decision preferably requires use of the driver-owned and driver-controlled ignition key and, thus, retains ownership and control by the driver of the safety conditions within the passenger cabin. This principle may be applied to dash-mounted air bags, side-mounted air bags, roof-mounted air bags and the like.

First through fourth indicator assemblies may be implemented utilizing either colored indicators or indicators formed as icons associated with the particular function being indicated as is known in the art. As such, the first through fourth indicator assemblies may be implemented utilizing light-emitting diodes, vacuum-fluorescent display elements, incandescent lamps, quartz lamps, pixilated display elements and other known display elements such as those incorporated into the electrochromic element of an electrochromic mirror reflective element.

When a vacuum-fluorescent display function is utilized with an icon dedicated to the blind spot detection display system, or to any other indicating function, the icon is typically formed with one or more electrodes of the vacuum-fluorescent display formed in the shape of the desired icon. A vacuum-fluorescent display typically utilizes a phosphor area which radiates light and a contrast enhancement filter which enhances the image of the icon generated by the electrode and phosphor coating. As an alternative, the icon may be formed as follows. The electrodes of the vacuum-fluorescent display may be formed utilizing a generic shape, such as a circle, square, or the like. Instead of forming the icon with the electrodes, the icon is formed by establishing the desired icon as a transparent or semitransparent window in an otherwise opaque portion of the contrast enhancement filter. Examples of such contrast enhancement filters can be found in the Larson et al. '060 patent. This is accomplished by providing a transparent or a semitransparent image enhancement portion in an otherwise opaque layer in the shape of the desired icon. Such contrast enhancement filter may be made from a colored polymeric sheet. Using pad printing, etching, printing, or the like, an opaque area is provided to outline the icon. In this manner, a universal icon display device is formed by the combination of a light-emitting element, such as a phosphoring area, of a display placed behind an opaque mask into which mask has been created the indicia of the icon. Thus, when the light-emitting element is emitting, the opaque mask blocks its light from the viewer, except in the regions defined by the transparent or semitransparent outline of the indicia of the icon. In this manner, the tooling of the vacuum fluorescent display, or other light-emitting display, can be standardized and the same display can be universally utilized to display any desired icon merely by customizing the creation of that icon onto the opaque area of the contrast enhancement filter. Thereby, ease of manufacturing and economy is achieved.

Changes and modifications in the specifically described embodiments can be carried out without departing from the principles of the invention, which is intended to be limited only by the scope of the appended claims, as interpreted according to the principles of patent law including the doctrine of equivalents.

The embodiments of the invention in which an exclusive property or privilege is claimed are defined as follows:

1. A rearview mirror system for a vehicle equipped with an airbag system comprising:

an interior rearview mirror assembly positioned within the passenger compartment of the vehicle, said mirror assembly including a reflective element and a housing for said reflective element;

a passenger-side airbag positioned within the passenger compartment of the vehicle and a control system for disabling operation of said airbag; and a passenger airbag disable indicator assembly, said indicator assembly located at said rearview mirror assembly, said indicator assembly providing a display of passenger airbag disable function and indicating when the passenger-side airbag has been disabled;

wherein said control system includes a key-operated switch which provides a key operation in order to disable said airbag, and wherein said control system automatically reactivates said airbag if the ignition of the vehicle is turned off after said airbag has been disabled by said key-operated switch.

2. The rearview mirror system of claim 1 wherein said key-operated switch of said control system is operable by the ignition key of the vehicle.

3. The rearview mirror system of claim 1 wherein said key operation to disable said airbag occurs separate from and prior to key-operated ignition of the engine of the vehicle by the ignition key of the vehicle.

4. The rearview mirror system of claim 3 wherein said key-operated switch of said control system is operable by the ignition key of the vehicle.

5. The rearview mirror system of claim 1 wherein said airbag is selected from one of a dash-mounted airbag, a side-mounted airbag and a roof-mounted airbag.

6. The rearview mirror system of claim 1 wherein said airbag comprises a dash-mount ed airbag.

7. The rearview mirror system of claim 1 wherein said reflective element comprises an electrochromic mirror element.

8. The rearview mirror system of claim 1 wherein said indicator assembly is located behind said reflective element and is viewed through said element.

9. The rearview mirror system of claim 1 wherein said indicator assembly is located below said reflective element in a lip portion of said housing.

10. The rearview mirror system of claim 1 wherein said indicator assembly is located above said reflective element in a eyebrow portion of said housing.

11. The rearview mirror sys tem of claim 1 wherein the intensity of the display of said indicator assembly is modulated dependent on the intensity of light levels surrounding the vehicle.

12. The rearview mirror system of claim 1 wherein said interior mirror assembly further comprises at least one other display function.

13. The rearview mirror system of claim 12 wherein said at least one other display function is selected from the group comprising a compass display function, a temperature display function, a rain sensor display function and a blind spot detector display function.

14. A rearview mirror system for a vehicle equipped with an airbag system, comprising:

an interior rearview mirror assembly positioned within the passenger compartment of the vehicle, said mirror assembly including a reflective element and a housing for said reflective element;

a passenger-side airbag positioned within the passenger compartment of the vehicle and a control system for disabling operation of said airbag; and a passenger airbag disable indicator assembly, said indicator assembly located at said rearview mirror assembly at one of above, below and behind said reflective element, said indicator assembly providing a display of passenger airbag disable function and indicating when the passenger-side airbag has been disabled;

wherein said control system includes a key-operated switch which provides a key operation in order to disable said airbag, and wherein said control system automatically reactivates said airbag if the ignition of the vehicle is turned off after said airbag has been disabled by said key-operated switch.

15. The rearview mirror system of claim 14 wherein said key-operated switch of said control system is operable by the ignition key of the vehicle.

16. The rearview mirror system of claim 14 wherein said key operation to disable said airbag occurs separate from and prior to key-operated ignition of the engine of the vehicle by the ignition key of the vehicle.

17. The rearview mirror system of claim 16 wherein said key-operated switch of said control system is operable by the ignition key of the vehicle.

18. The rearview mirror system of claim 14 wherein said airbag is selected from one of a dash-mounted airbag, a side-mounted airbag and a roof-mounted airbag.

19. The rearview mirror system of claim 14 wherein said reflective element comprises an electrochromic mirror element.

20. The rearview mirror system of claim 14 wherein said indicator assembly is located behind said reflective element and is viewed through said element.

21. The rearview mirror system of claim 14 wherein said indicator assembly is located below said reflective element in a lip portion of said housing.

22. The rearview mirror system of claim 14 wherein said indicator assembly is located above said reflective element in a eyebrow portion of said housing.

23. The rearview mirror system of claim 14 wherein the intensity of the display of said indicator assembly is modulated dependent on the intensity of light levels surrounding the vehicle.

24. The rearview mirror system of claim 14 wherein said interior mirror assembly further comprises at least one other display function.

25. The rearview mirror system of claim 24 wherein said at least one other display function is selected from the group comprising a compass display function, a temperature display function, a rain sensor display function and a blind spot detector display function.

26. A rearview mirror system for a vehicle equipped with an airbag system, comprising:

an interior rearview mirror assembly positioned within the passenger compartment of the vehicle, said mirror assembly including a reflective element and a housing for said reflective element;

a passenger-side airbag positioned within the passenger compartment of the vehicle and a control system for disabling operation of said airbag;

a passenger airbag disable indicator assembly, said indicator assembly located at said rearview mirror assembly, said indicator assembly providing a display of passenger airbag disable function and indicating when the passenger-side airbag has been disabled;

wherein said control system includes a key-operated switch which provides a key operation in order to disable said airbag; and wherein said key-operated switch of said control system is operable by the ignition key of the vehicle, and wherein said control system automatically reactivates said airbag if the ignition of the vehicle is turned off after said airbag has been disabled by said key-operated switch.

27. The rearview mirror system of claim 26 wherein said key operation to disable said airbag occurs separate from and prior to key-operated ignition of the engine of the vehicle by the ignition key of the vehicle.

28. The rearview mirror system of claim 26 wherein said airbag is selected from one of a dash-mounted airbag, a side-mounted airbag and a roof-mounted airbag.

29. The rearview mirror system of claim 26 wherein said reflective element comprises an electrochromic mirror element.

30. The rearview mirror system of claim 26 wherein said indicator assembly is located at one of above, below and behind said reflective element.

31. The rearview mirror system of claim 26 wherein said indicator assembly is located behind said reflective element and is viewed through said element.

32. The rearview mirror system of claim 26 wherein said indicator assembly is located below said reflective element in a lip portion of said housing.

33. The rearview mirror system of claim 26 wherein said indicator assembly is located above said reflective element in a eyebrow portion of said housing.

34. The rearview mirror system of claim 26 wherein the intensity of the display of said indicator assembly is modulated dependent on the intensity of light levels surrounding the vehicle.

35. The rearview mirror system of claim 26 wherein said interior mirror assembly further comprises at least one other display function.

36. The rearview mirror system of claim 35 wherein said at least one other display function is selected from the group comprising a compass display function, a temperature display function, a rain sensor display function and a blind spot detector display function.

37. A rearview mirror system for a vehicle equipped with an airbag system, comprising:

an interior rearview mirror assembly positioned within the passenger compartment of the vehicle, said mirror assembly including a reflective element and a housing for said reflective element;

a passenger-side airbag positioned within the passenger compartment of the vehicle and a control system for disabling operation of said airbag; and a passenger airbag disable indicator assembly, said indicator assembly located at said rearview mirror assembly, said indicator assembly providing a display of passenger airbag disable function and indicating when the passenger-side airbag has been disabled;

wherein said control system automatically reactivates said airbag if the ignition of the vehicle is turned off after said airbag has been disabled by said control system.

38. The rearview mirror system of claim 37 wherein said control system includes a key- operated switch which provides a key operation in order to disable said airbag.

39. The rearview mirror system of claim 38 wherein said key-operated switch of said control system is operable by the ignition key of the vehicle.

40. The rearview mirror system of claim 38 wherein said key operation to disable said airbag occurs separate from and prior to key-operated ignition of the engine of the vehicle by the ignition key of the vehicle.

41. The rearview mirror system of claim 40 wherein said key-operated switch of said control system is operable by the ignition key of the vehicle.

42. The rearview mirror system of claim 38 wherein said reflective element comprises an electrochromic mirror element.

43. The rearview mirror system of claim 37 wherein said airbag is selected from one of a dash-mounted airbag, a side-mounted airbag and a roof-mounted airbag.

44. The rearview mirror system of claim 37 wherein said airbag comprises a dash-mounted airbag.

45. The rearview mirror system of claim 37 wherein said reflective element comprises an electrochromic mirror element.

46. The rearview mirror system of claim 37 wherein said indicator assembly is located at one of above, below and behind said reflective element.

47. The rearview mirror system of claim 37 wherein said indicator assembly is located behind said reflective element and is viewed through said element.

48. The rearview mirror system of claim 37 wherein said indicator assembly is located below said reflective element in a lip portion of said housing.

49. The rearview mirror system of claim 37 wherein said indicator assembly is located above said reflective element in a eyebrow portion of said housing.

50. The rearview mirror system of claim 37 wherein the intensity of the display of said indicator assembly is modulated dependent on the intensity of light levels surrounding the vehicle.

51. The rearview mirror system of claim 37 wherein said interior mirror assembly further comprises at least one other display function.

52. The rearview mirror system of claim 51 wherein said at least one other display function is selected from the group comprising a compass display function, a temperature display function, a rain sensor display function and a blind spot detector display function.

* * * * *